United States Patent Office 3,436,793
Patented Apr. 8, 1969

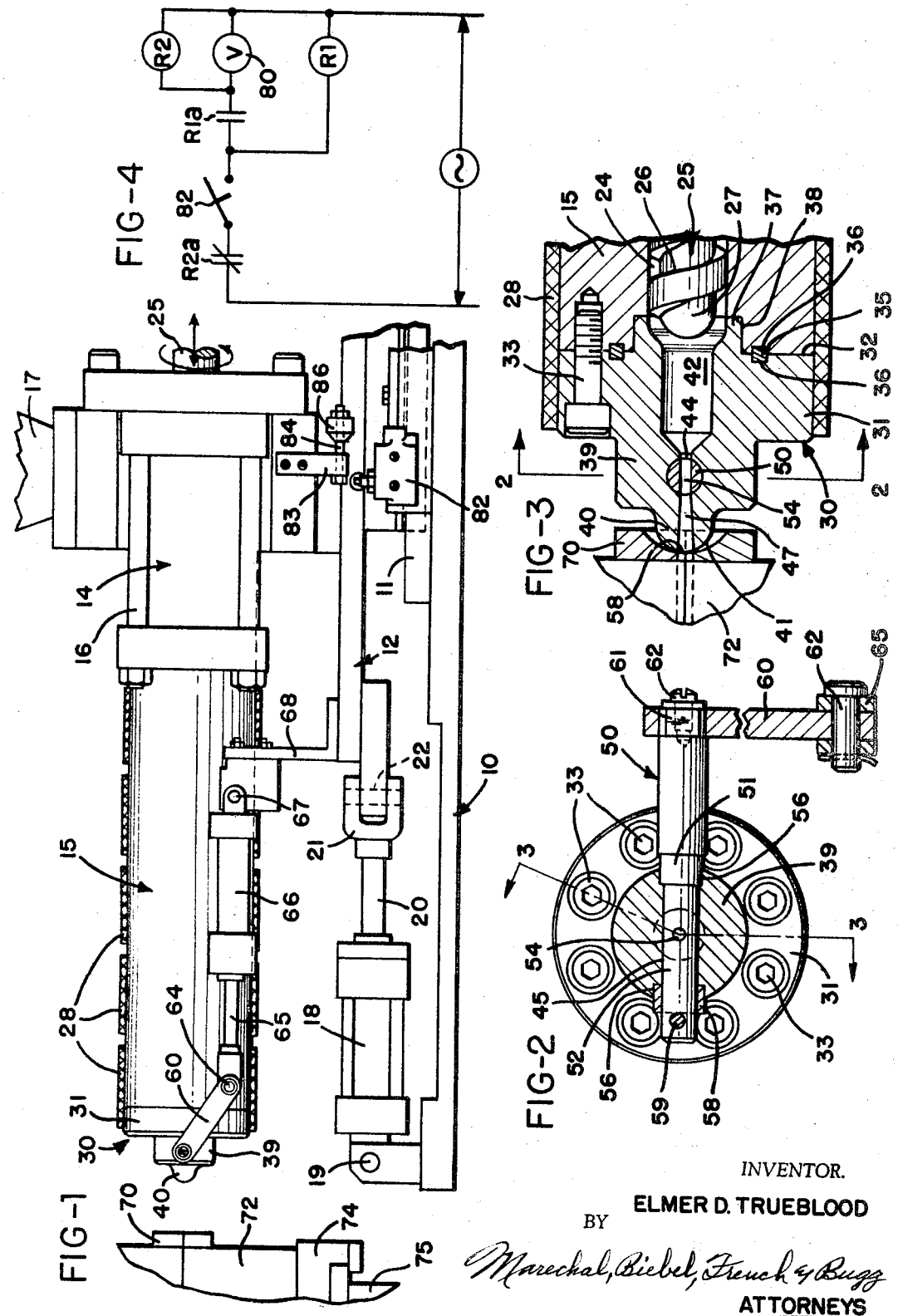

3,436,793
INJECTION MOLDING MACHINE
Elmer D. Trueblood, Dayton, Ohio, assignor to Trueblood, Inc., doing business as Union Tool & Engineering Co., Dayton, Ohio, a corporation of Ohio
Filed Aug. 19, 1966, Ser. No. 573,563
Int. Cl. B29f 1/03, 1/08
U.S. Cl. 18—30          6 Claims

ABSTRACT OF THE DISCLOSURE

A movable plasticizing cylinder receives a ram at one end and is closed at the opposite end by a closure member including a cylindrical base portion having an outer diameter the same as the cylinder for receiving a surrounding heating element. A nozzle tip is formed integrally with the base portion, and a valve member is positioned within a laterally extending opening located adjacent the base portion. The valve member is actuated by a pressure cylinder which is controlled by a solenoid valve actuated by time delay relay means and a switch operated in response to movement of the cylinder.

---

This invention relates to plastic injection machines, and more particularly, to an improved plastic injection machine which provides precise temperature and pressure control of the plasticized material prior to injection into a mold cavity.

The present invention has special relation to the plastic injection machines disclosed in E. D. Trueblood patents, No. 3,172,161, issued Mar. 9, 1965, and No. 3,091,809 issued June 4, 1963. Specifically, the present invention is directed to an improved plastic injection machine which maintains a charge of molten plastic material at a substantially constant predetermined temperature until the material is injected into the mold, and provides for precise control of the pressure under which the material is injected into the mold.

A plastic injection machine of the general type disclosed in the above patent, commonly includes an elongated barrel or cylinder which defines a central mixing chamber and is supported on tracks for axial movement by a pressure cylinder. A ram screw is supported within the chamber and is adapted to be plunged forwardly by a pressure cylinder to advance material within the chamber and to inject a charge of material from the discharge end of the cylinder into the mold. The screw is rotated during its retracting stroke to form a charge of plasticized material into the chamber at one end of the screw prior to injection.

A series of band-type heating elements are provided around the cylinder to convert the granulated plastic material into a molten or plasticized state while the material is advanced axially through the chamber. An elongated nozzle member is commonly threaded into the end wall of the cylinder and includes a rounded nose or tip portion adapted to engage a nozzle plate mounted on the mold.

A valve is provided within the nozzle member to control the discharge of plasticized material from the nozzle tip while in contact with the nozzle plate on the mold. Due to the length of the nozzle member required for threading the nozzle member into the press cylinder and to provide for mounting of the valve, however, the nozzle tip commonly projects a substantial distance from the discharge end of the cylinder. To prevent partial solidification of a charge of molten plastic material during the time the charge is confined within the nozzle member, a heating element is usually provided around the nozzle member, as shown in the above Patent No. 3,172,161.

As a result of the mass difference between the plasticizing cylinder and the nozzle member and the use of separate heating element on the nozzle member, it has been found difficult to maintain the temperature of the nozzle member at a level constant with the temperature of the cylinder. As a result, the consistency of the plasticized material discharged from the nozzle tip will vary during operation of the machine. This variation is undesirable in that it can result in non-uniformity of the molded plastic parts.

It has also been found desirable to provide a control of the pressure at which the plasticized material is injected by the ram screw into the mold cavity. For example, in the molding of plastic parts having intricate detail or thin wall sections, it is desirable to inject the plasticized material quickly to fill the entire mold cavity before the temperature of the material drops by a significant amount and prevents complete filling of the cavity.

Accordingly, it is a primary object of the present invention to provide an improved injection molding machine wherein plasticized material is maintained at a substantially constant temperature until the material is injected into a mold.

A more specific object of the invention is to provide a nozzle tip which is formed as an integral part of a closure member for the plasticizing cylinder to provide an axially compact construction which eliminates the need for a separate heating element for the nozzle tip.

A further object of the invention is to provide a cylinder closure member including a nozzle tip and a discharge control valve in close axial spaced relationship so that heating of the closure member with the heating of said cylinder is effective to maintain the plasticized material at a substantially constant temperature until the material is injected into the mold.

Still another object is to provide improved means for actuating the control valve for providing quick injection of material into the mold for producing plastic parts having intricate detail or thin wall sections.

Other objects and advantages of the invention will be apparent from the following description, the accompanying drawing and the appended claims.

In the drawing—
FIG. 1 is an elevational view of a portion of a plastic injection machine constructed in accordance with the invention and with the heating elements shown in section;
FIG. 2 is a section view as taken generally along the line 2—2 of FIG. 3;
FIG. 3 is a fragmentary section view as taken generally along the line 3—3 of FIG. 2; and
FIG. 4 is an electrical diagram of a circuit for controlling the operation of the discharge control valve.

Referring to the drawing which illustrates a preferred embodiment of the invention, a plastic injection machine constructed in accordance with the invention is shown in FIG. 1 and generally includes a frame 10 having guideways 11 which slidably support a carriage 12. A housing 14 is mounted on the carriage 12 and supports an elongated plasticizing cylinder 15 secured to the housing by bolts 16. The housing 14 also supports a hopper 17 adapted to receive plastic material in granulated form. The carriage 12 is reciprocated by a double acting fluid cylinder 18 having one end connected by one pin 19 to the frame 10 and a piston rod 20 connected to the carriage by a U-shaped link 21 and pin 22.

The cylinder 15 defines an axially extending cylindrical chamber 24 (FIG. 3) which slidably supports a ram-type screw 25 having a helical flight 26 and a rounded forward nose portion 27. The screw 25 is connected to a motor drive unit (not shown) which is movable relative to the carriage 12 by a hydraulic cylinder (not shown) to reciprocate the screw within the chamber 24. The screw is rotated by the drive unit while the screw is being retracted within the chamber 24 to feed plastic material from the hopper 17 into the chamber 24. As shown in FIG. 1, a series of band-type heating elements 28 are mounted on the outer surface of the cylinder 15 which heat the cylinder 15 to plasticize the plastic material which is being advanced within the chamber 24 by the screw 25.

A cylinder closure member 30 (FIG. 3) including a cylindrical base portion 31 is secured to the end surface 32 of the cylinder 15 by a series of screws 33 extending through annularly arranged holes formed within the base portion 31 and threaded into corresponding tapped holes 34 formed within the end portion of the cylinder 15. The base portion 31 of the closure member 30 has an outer diameter which is the same as the outer diameter of the cylinder 15 and, as shown in FIGS. 1 and 3, the end heating band or element 28 is positioned to overlap the base portion 31. A soft metal ring 35, preferably copper or aluminum, is received within mating annular grooves 36 formed within the base portion 31 and cylinder 15 to form a pressure seal between the base portion and the cylinder 15.

The closure member 30 includes a cylindrical hub portion 37 which projects from the inner side of the base portion 31 of the closure member 30 and is received within a corresponding counterbore 38 formed within the cylinder 15 to locate the closure member 30 in axial alignment with the cylinder 15. A cylindrical valve body portion 39 projects outwardly from the opposite side of the base portion 31 and an integral nozzle tip 40 having an outer semi-spherical surface 41, projects from the valve body portion 39.

A cylindrical collecting chamber 42 is formed within the base portion 31 of the closure member 30 and extends from the chamber 24 which is slightly larger in diameter. The chamber 42 tapers within the valve body portion 39 and opens through a port 44 into a laterally or transversely extending opening or bore 45 formed within the portion 39. An outwardly tapering discharge passageway 47 extends from the opposite side of the bore 45 through the nozzle tip 40 and defines at the end of the nozzle tip a discharge orifice 48 which is slightly larger in diameter than the port 44.

An elongated nozzle flow control valve member 50 having cylindrical portions 51 and 52 of reduced diameter, is rotatably mounted within the bore 45 and the portion 52 includes a port 54 which is alignable with the port 44 and tapered discharge passageway 47. The cylindrical portion 51 of the valve member is received within one of two counterbores 56 formed within the valve body portion 37 and a collar 58 is mounted within the other counterbore. The cylindrical portion 52 of the valve member 50 projects beyond the collar 58 and receives a cross pin 59 for retaining the valve member within the bore 45.

The valve member 50 is rotated by a lever 60 having one end rigidly mounted on the projecting end portion 61 of the valve member 50 and retained by a screw 62. The opposite end of the lever 60 is pivotally connected by a pin 64 to a piston rod 65 extending from a double acting hydraulic cylinder 66. The cylinder 66 is pivotally connected by a pin 67 to a bracket 68 mounted on the carriage 12. As shown in FIG. 3, the spherical surface 41 of the nozzle tip 40 is adapted to engage a nozzle plate 70 formed on a mold 72. The mold is supported by a table 74 slidably mounted on a bed 75 supported by the frame 10, as shown in the above Patent No. 3,091,809.

A typical control circuit according to this invention is shown in FIG. 4. The hydraulic cylinder 66 is controlled by a double action solenoid controlled valve 80. The solenoid is connected in series with the normally open contacts R1a of a time delay relay R1. The coil of the time delay relay R1 is connected in parallel with the series connection of the solenoid valve 80 and relay contacts R1a. The coil of a second time delay relay R2 is connected in parallel with the solenoid valve 80 and its normally closed contacts R2a are connected in sires with a switch 82 and the coil of the relay R1. Referring to FIG. 1, a bracket 83 is mounted on the housing 14 and supports an axially extending rod 84. A cam actuator 86 is adjustably mounted on the rod 84 and is adapted to operate the switch 82 when the carriage 12 is moved by the cylinder 18.

In operation, at the beginning of a cycle, the hydraulic cylinder 18 is energized to move the plasticizing cylinder 15 to the injecting position of FIG. 3. During the movement of the cylinder, the cam actuator 86 closes the switch 82 which energizes the coil of the relay R1. After a predetermined time, the relay contacts R1a close to energize the solenoid valve 80 which operates the hydraulic cylinder 66 to extend the piston rod 65. This rotates the valve member 50 to align the port 54 with the port 44 and tapered discharge passageway 47 so that the timed advancement of the ram screw 25 injects a charge of plasticized material from the collecting chamber 42 into a cavity within the mold 72.

Energizing of the solenoid valve 80 to open the valve member 50 also energizes the coil of the relay R2 so that after a predetermined time, the normally closed contacts R2a are opened thereby deenergizing the solenoid valve 80 causing rotation of the valve member 50 to close the port 44. The cylinder 15 is then retracted by actuation of the fluid pressure cylinder 18 and simultaneously the screw 25 is rotated to feed plastic material from the hopper 17 into the chamber 24.

One important feature provided by forming the valve body portion 39 integrally with the base portion 31 is that the mass of the valve body portion 39 is reduced to such an extent that the heating of the cylinder 15 and the base portion 31 by the heating elements 28, maintains the temperature of the valve body portion 39 and nozzle tip 40 substantially constant with the temperature of the cylinder 15. Thus, no additional heating means is necessary for the portion 39 or the nozzle tip 40 to maintain the plasticized material within the chamber 42 and port 54 at a constant temperature prior to injection of the material into the mold 72.

As a result, it has been found that the quality of the molded plastic parts is substantially more uniform and consistent. Furthermore, it has been found that the integral construction of the base portion 31, valve body portion 39 and nozzle tip 40 provides for a reduction in the cost of manufacturing and assembling of the plasticizing cylinder 15.

Another important feature of the invention is provided by the control system for operating the valve member 50. That is, by incorporating the time delay relays R1 and R2 within the circuit for controlling the operation of the hydraulic cylinder 66, the timing of the opening and closing of the valve member 50 can be precisely controlled by adjusting the position of the cam actuator 86 on the rod 84. For example, with some molded parts having intricate detail or thin wall sections, the cam actuator 86 can be adjusted so that the contacts R1a of the time delay relay R1 will close to operate the cylinder 66 and open the valve member 50 after the ram screw 25 has advanced partially within the chamber 24. This provides for a pressure build up of plasticized material within the chambers 24 and 42 which, in turn, produces a faster injection of the material into the mold cavity when the valve member 50 is opened. This quick injection assures that the mold cavity will be completely filled with plasticized material before the material begins to solidify.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine for injecting plasticized material into a mold cavity and including an elongated cylinder having means defining an axially extending plasticizing bore therein, means for moving said cylinder alternately from a retracted position to an extended injecting position, ram means within said bore for advancing plastic material therethrough, and heating means mounted on said cylinder for plasticizing the material fed through said bore, the improvement comprising a closure member for the discharge end of said cylinder and including a cylindrical base portion having an outer diameter substantially the same as that of said cylinder, means for removably securing said base portion of said closure member to the discharge end of said cylinder, means defining a chamber within the center of said base portion and extending from said plasticizing bore, a nozzle tip integrally formed with said base portion and having means defining a central discharge passageway therein opening into said chamber, means defining a laterally extending opening within said closure member adjacent said base portion, a valve member disposed within said opening and including means defining a port therein, means for selectively positioning said valve member for controlling the flow of plasticized material from said chamber to said discharge passageway within said nozzle tip, and said heating means including a heating element extending around said base portion so that heating of said base portion is effective to maintain the plasticized material within said chamber and said port at a substantially constant temperature for producing molded plastic parts of uniform quality.

2. A plastic injection machine as defined in claim 1 wherein said chamber within said base portion is cylindrical and has a diameter substantially larger than said port.

3. A plastic injection machine as defined in claim 1 wherein said means for positioning said valve member includes fluid cylinder means, a solenoid controlled valve for operating said fluid cylinder means, switch means operable in response to movement of said cylinder and connected to control the operation of said valve, and time delay means actuated by said switch means for delaying the precise time of opening of said solenoid valve until the plasticized material within said chamber is effectively pressurized by said ram means for providing rapid injection of the material into the mold cavity.

4. A closure member for the discharge end of a plasticizing cylinder of an injection molding machine, comprising a cylindrical base portion, means defining a series of holes within said base portion for receiving corresponding screws adapted to secure said closure member to the discharge end of said cylinder, means defining a collecting chamber within said base portion and adapted to receive material from said plasticizing cylinder, a nozzle tip integrally formed with said base portion and having means defining a central discharge passageway therein, a laterally extending opening within said closure member adjacent said base portion, a valve member disposed within said opening and including means defining a port therein, means for selectively positioning said valve member to control the flow of plasticized material from said collecting chamber to said discharge passageway within said nozzle tip, and said base portion having an outer diameter substantially the same as said cylinder for receiving a surrounding heating element so that heating of said base portion with the heating of said cylinder is effective to maintain the plasticized material within said collectng chamber and said port at a substantially constant temperature for producing molded parts of uniform quality.

5. In a machine for injecting plasticized material into a mold cavity and including an elongated cylinder having means defining an axially extending plasticizing chamber therein, means for moving said cylinder alternately from a retracted position to an extended injecting position, ram means for advancing plastic material through said chamber, heating means on said cylinder for plasticizing the material fed through said chamber, closure means for the discharge end of said cylinder, a nozzle tip connected to said closure means and including means defining a central discharge passageway therein, means defining a laterally extending opening within said closure member, a movable valve member disposed within said opening and including means defining a port therein, fluid cylinder means for selectively positioning said valve member for controlling the flow of plasticized material from said collecting chamber to said discharge passageway within said nozzle tip, a solenoid controlled valve for operating said fluid cylinder means, switch means operable in response to movement of said cylinder and connected to control the operation of said valve, and time delay means actuated by said switch means for delaying the precise time of opening of said solenoid valve until the plasticized material within said collecting chamber is substantially pressurized by said ram means for providing rapid injection of the material into the mold cavity.

6. A plastic injection machine as defined in claim 5 including a cam member connected to said cylinder for movement therewith and positioned to actuate said switch means, and means for adjustably positioning said cam member relative to said cylinder for selecting the precise instant of actuation of said solenoid valve through said time delay means.

References Cited
UNITED STATES PATENTS

| | | |
|---|---|---|
| 2,318,031 | 5/1943 | Tucker. |
| 2,459,048 | 1/1949 | Schwartz et al. |
| 2,567,693 | 9/1951 | Brunner. |
| 3,137,038 | 6/1964 | Maynard. |
| 3,172,161 | 3/1965 | Trueblood. |

FOREIGN PATENTS

| | | |
|---|---|---|
| 515,133 | 4/1953 | Italy. |
| 3,818,521 | 9/1963 | Japan. |

WILBUR L. McBAY, *Primary Examiner.*